US008371474B2

(12) United States Patent
Tramontina et al.

(10) Patent No.: US 8,371,474 B2

(45) Date of Patent: Feb. 12, 2013

(54) FLUID DISPENSER

(75) Inventors: Paul Francis Tramontina, Harleysville, PA (US); Richard Paul Lewis, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 431 days.

(21) Appl. No.: 12/628,665

(22) Filed: Dec. 1, 2009

(65) Prior Publication Data

US 2011/0127291 A1 Jun. 2, 2011

(51) Int. Cl.

| | |
|---|---|
| ***B67B 7/00*** | (2006.01) |
| ***G01F 11/00*** | (2006.01) |
| ***B67D 1/00*** | (2006.01) |
| ***B67D 7/14*** | (2010.01) |
| ***B67D 7/76*** | (2010.01) |
| ***G04C 23/00*** | (2006.01) |
| ***G05D 7/00*** | (2006.01) |

(52) U.S. Cl. .............. 222/1; 222/52; 222/190; 222/642; 222/644

(58) Field of Classification Search .................... 222/52, 222/644, 63, 333, 190, 173, 642, 645, 646, 222/135, 137; 239/67–70

See application file for complete search history.

(56) References Cited

U.S. PATENT DOCUMENTS

| | | | | |
|---|---|---|---|---|
| 4,722,372 | A * | 2/1988 | Hoffman et al. | 141/98 |
| 4,938,384 | A * | 7/1990 | Pilolla et al. | 222/52 |
| 4,967,935 | A * | 11/1990 | Celest | 222/52 |
| 5,305,916 | A * | 4/1994 | Suzuki et al. | 222/52 |
| 5,449,117 | A * | 9/1995 | Muderlak et al. | 239/6 |
| 5,507,413 | A * | 4/1996 | Chen | 222/63 |
| 6,065,639 | A * | 5/2000 | Maddox et al. | 222/36 |
| 6,267,297 | B1 * | 7/2001 | Contadini et al. | 239/1 |
| 6,276,274 | B1 * | 8/2001 | Hoffman et al. | 101/474 |
| 6,375,038 | B1 * | 4/2002 | Daansen et al. | 222/52 |
| 6,629,150 | B1 * | 9/2003 | Huded | 709/247 |
| 6,644,507 | B2 * | 11/2003 | Borut et al. | 222/37 |
| 7,069,941 | B2 * | 7/2006 | Parsons et al. | 137/1 |
| 7,458,523 | B2 * | 12/2008 | Hyslop | 239/67 |
| 7,540,397 | B2 * | 6/2009 | Muderlak et al. | 222/400.5 |
| 7,594,622 | B2 * | 9/2009 | Witt et al. | 242/563.2 |
| 2004/0050876 | A1 | 3/2004 | Muderlak et al. | |
| 2004/0074935 | A1 * | 4/2004 | Chon | 222/646 |
| 2005/0247735 | A1 | 11/2005 | Muderlak et al. | |
| 2006/0076366 | A1 * | 4/2006 | Furner et al. | 222/402.13 |
| 2007/0199952 | A1 * | 8/2007 | Carpenter et al. | 222/52 |
| 2008/0186396 | A1 * | 8/2008 | Nakajima et al. | 348/333.01 |
| 2009/0166381 | A1 | 7/2009 | Phelps et al. | |
| 2010/0140300 | A1 | 6/2010 | Lewis et al. | |

* cited by examiner

*Primary Examiner* — Kevin P Shaver

*Assistant Examiner* — Vishal Pancholi

(74) *Attorney, Agent, or Firm* — Nancy M. Klembus

(57) ABSTRACT

The invention is a method of dispensing a fluid and a dispenser which will dispense an appropriate amount of fluid to effectively clean a user's hand, even if the dispenser is inactive for a period of time.

7 Claims, 8 Drawing Sheets

FLUID DISPENSER

FIELD OF THE INVENTION

The present invention generally relates to a fluid dispenser.

BACKGROUND OF THE INVENTION

Users of public restroom facilities often desire that all of the fixtures in the restroom operate automatically without being touched by the user's hands. This desire is generally due to the increased user awareness of the degree to which germs and bacteria may be transmitted from one person to another in a public restroom environment. As a result, many public restrooms are being transitioned to "hands-free" or "no-touch" restrooms, where all of the fixtures, including toilet and urinal units, hand washing faucets, soap dispensers, towel dispensers and door opening mechanisms, are automatic and operate without being touched by a user. It is believed by many users that hands-free or no-touch public restroom facilities reduces the opportunity for transmission of viruses and bacteria which may result from contact with fixtures in a public restroom.

In office buildings and other similar upscale buildings, the building owner or manager many times wants to offer upscale public restroom facilities to match the buildings décor. One way the building owner or manager can provide an upscale public restroom is to provide in-counter soap dispensers, rather than wall mounted units or on-counter dispensers. In-counter soap dispensers generally have a dispensing nozzle above the counter. Typically, in-counter soap dispensers have a reservoir, which holds the soap, and pump to move the soap from the reservoir to the nozzle. The reservoir and pump are generally mounted underneath the counter. In-counter soap dispensers are known in the art. See, for example, U.S. Pat. Nos. 6,142,342, 6,467,651 and U.S. Patent Application Publication US200910166381 A1. These dispensers deliver an essentially uniform amount of soap on each attenuation of the pump located in the dispenser.

Foam soaps in recent years are gaining in popularity. Generally, foam soaps are stored in a reservoir as a liquid until the time of dispensing. At the time of dispensing, a foam pump pumps the liquid from the reservoir and the pump converts the liquid to foam. Foam soaps tend to be much easier to spread than a corresponding liquid soaps. In addition, foam soaps result in less waste of the soap due to splashing or run-off the users hand since foam soaps typically have much higher surface tension than liquid soaps. Generally, foam soaps give the user a perception of having more soap available to wash their hands than an equivalent weight of a liquid soap. That is, a sufficient amount of a liquid soap to wash a users hand may give the user a perception that there is an insufficient amount of soap to complete the hand washing event. Many times, the user will seek one or more additional doses of liquid soap to complete the hand washing event, if the user perceives the amount of soap dispensed is insufficient to complete the hand washing event. As a result, dispensers which dispense foam soaps tend to provide more hand washings, on a liquid volume basis of the soap in a reservoir, as compared to dispensers which dispense liquid soaps.

In-counter foam soap dispensers are generally of two types. One is a pressurized system which generates the foam at the nozzle. A second type is a non-pressurized system. Pressurized systems are expensive to install and maintain. Non-pressurized systems typically generate the foam under the counter and send the foam to an outlet of the nozzle via a tube. A certain amount of the foam soap remains in the tube until the next use. However, foams tend to collapse overtime and return to a liquid form. This process is called liquefaction. When liquefaction of the foam soap occurs, the dispenser may not dispense a sufficient quantity of the foam soap to effectively clean the hands of the user. Non-pressurized systems have the advantage of a lower initial cost and a lower maintenance cost.

One way to deal with liquefaction is to dispense more foam soap than is needed to clean the user's hands. However, providing too much soap to the user requires the user to use more water to effectively remove the soap from the user's hands. This can result in a waste of water and soap. Wasting water and soap on each hand washing event can result in an increase cost to the building owner in building operation.

Another issue in the art is fluid dispensers which have dispensing tubes which are relatively long may experience fluid loss in the dispensing tube during period of non-use. This can be caused by many different factors, including, for example, evaporation of the fluid, leaking of the fluid from the dispensing tube among other reasons. As a result, a dispenser having a delivery tube may not dispense a sufficient amount of a fluid, in particular a hand cleaning fluid to effectively clean a user's hands.

There is a need in the art for a non-pressurized hands-free foam soap dispenser that effectively will dispense a sufficient amount of foam soap, even if the liquefaction or collapse of the foam soap occurs between uses of the dispenser. In addition there is a need in the art for a fluid dispenser which will always provide a user with sufficient fluid to clean a user's hand during a hand washing event.

SUMMARY OF THE INVENTION

Generally stated, the present invention provides an easy to maintain fluid dispenser that will always deliver a sufficient amount of fluid, even if the dispenser has been unused for an extended period of time.

In one embodiment, the present invention provides a fluid dispenser. The fluid dispenser has a reservoir for holding a fluid; a pump having an inlet and an outlet and the pump draws the fluid from the reservoir through the inlet; a dispensing tube directly or indirectly connected to the outlet of the pump; a nozzle; a motor; an attenuator in communication with the motor; a processor in communication with the motor; and a sensor to detect the presence of a user and the sensor is in communication with the processor. The nozzle is adapted to receive the dispensing tube and dispense the fluid to a user. Activating the pump is the attenuator, which is driven by the motor. The processor is configured to determine a time interval between dispensing cycles and to activate the motor for one or more cycles, based on the time interval between dispensing cycles. When the sensor detects the presence of a user, the sensor provides an input to the processor and the processor determines the time period between dispensing cycles and provides an input to the motor to activate for one or more cycles.

In another embodiment of the present invention, the processor of the dispenser activates the motor for a single cycle, if the time interval between dispensing cycles is less than a pre-set time period, or for multiple cycles, if the time interval between dispensing cycles is greater than a pre-set time period.

The dispenser of the present invention may also have a suck back mechanism located between the outlet of the pump and the dispensing tube. The suck back mechanism serves to prevent fluid remaining in the dispensing tube from dripping from the nozzle between uses.

In one embodiment of the present invention, the pump may be a foaming pump which draws a foam precursor from the reservoir through the inlet. The foaming pump combines a gas with the foam precursor to form a foam.

In another embodiment, provided is a method of dispensing a fluid to a user from a fluid dispenser. This method includes providing a fluid dispensing system having sensor, a motor and a pump. The method detects the presence of a current user requesting a fluid from the dispensing system and determines a time lapse period between a previous request for fluid and the current requests for fluid. This time lapse period is compared to a pre-set time period. Next a motor is activated for a single cycle if the time lapse period is less than the pre-set period of time or for multiple cycles if the time lapse is greater that the set period of time.

The fluid which may be dispensed in the process and dispenser of the present invention may be a liquid soap, a liquid sanitizer, a gel soap, a foam soap precursor or a foaming sanitizer precursor.

In a further embodiment of the present invention, the preset time period is between about 10 minutes and about 6 hours. When the fluid is a foam soap or sanitizer, the pre-set time period is correlated to a liquefaction time of the foam. Generally, the pre-set time between about 10 minutes and about 1 hour, when the fluid being dispensed is foam from a foam precursor.

In yet further embodiments of the present invention, additional features which may be present in the dispenser include the nozzle is mounted above the counter via a mounting means which extends through the counter. The present invention may also have a power supply connected to the processor, sensor and motor.

In a particular embodiment of the present invention, the multiple cycles is two or three cycles.

In one particular embodiment, the dispenser and method of the present in invention the dispenser dispenses a volume of fluid between between about 0.45 ml and about 2.0 ml. In a more particular embodiment, the dispenser dispenses a volume of fluid between about 0.55 ml and about 0.65 ml.

The present invention provides an easy to maintain fluid dispenser which will dispense an appropriate amount of fluid to effectively clean a user's hand, even if the dispenser has been idle for an extended period of time.

DEFINITIONS

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

DETAILED DESCRIPTION OF THE INVENTION

In the following detailed description of the present invention, reference is made to the accompanying drawings which form a part hereof, and which show by way of illustration, specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

The dispenser of the present invention may be an in-counter dispenser or a above-counter dispenser. The above-counter dispenser may be a wall mounted dispenser such that the fluid is conveyed to the delivery spout via a delivery tube between the pump and the nozzle. Generally, however, the present invention will be more useful in in-counter dispensers. Therefore, the present invention will described in terms of the in-counter dispenser which is mounted through the counter in a restroom or other facility where hand cleaning or sanitizing may be needed.

Figure 1:
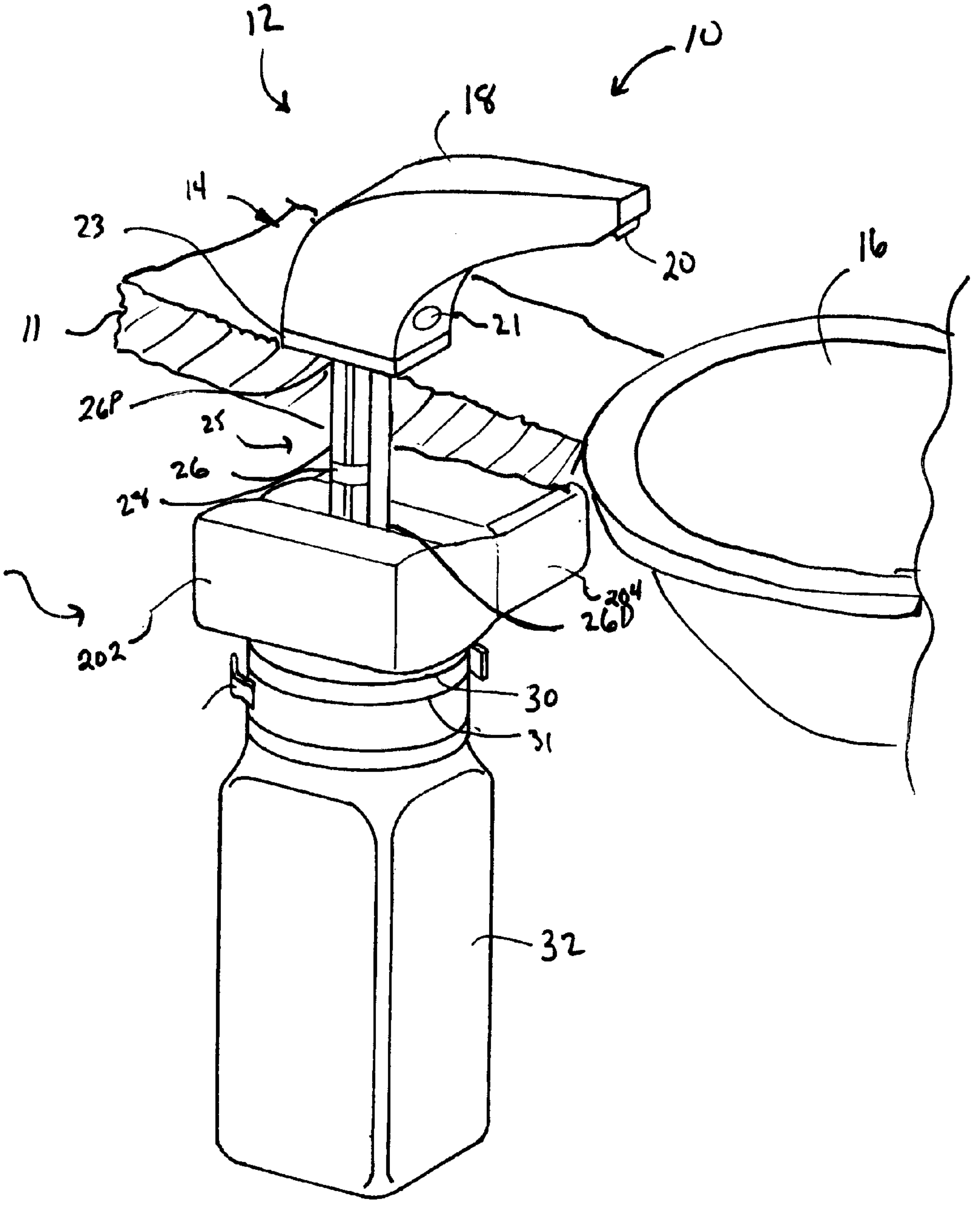
FIG. 1 shows a fluid dispenser with a reservoir attached to a dispensing portion of the dispenser.

To gain a better understanding of the present invention, attention is directed to the Figures of the present specification. FIG. 1 illustrates an automatic dispenser apparatus 10 of the present invention, mounted in a counter 11 in a typical restroom facility. As shown, the dispenser apparatus includes a dispenser fixture 12 having an above-counter portion 14 located adjacent to a sink bowl 16. As shown, above-counter portion 14 includes a dispensing head or nozzle 18 having a delivery spout 20 extending from the dispensing head 18. Delivery spout 20 is positioned and configured in a conventional manner to supply fluid to the hand or hands of a user. As shown, the delivery spout 20 is positioned over the sink bowl 16, so that in an event that the fluid is unintentionally dispensed from the dispensing apparatus, the fluid will make its way into the sink bowl 16, rather than the counter 11. To dispense the fluid from the dispenser apparatus, a user passes their hand or hands under the delivery spout 20, where a sensor 21 detects the hand or hands or the user under the delivery spout 20. Suitable sensors useable in the present invention are any type of sensor that will detect the presence of a user's hand or hands under the delivery spout 20. An exemplary type of sensor is an infrared (IR) sensor. When the sensor 21 detects the user's hand or hands under the delivery spout, an electronic means is activated and a quantity of the fluid delivered to the user's hand.

The dispenser fixture 12 includes an under-counter portion 24 having a mounting system 25 securing the dispenser fixture 12 to the counter. The mounting system 25 has an elongated tube 26, which is a generally elongated hollow tube, extending through a hole defined in counter 11. By "hollow", it is intended that a tube has a passage or channel (not shown in FIG. 1) that extends through the elongated tube 26 from proximate end 26P of the elongated tube 26, which is located above the counter 11, to the distal end 26D of the elongated tube 26 located below the counter 11. The elongated tube 26 has a flange 23 on the proximate end 26P of the elongated tube 26 that the flange 23 is positioned above the counter 11. The flange 23 is of a size which is larger than the hole in the counter 11 and the flange 23 serves to keep the elongated tube 26 from falling through the counter 11. As is shown in FIG. 1, the mounting system 25 also has an anchoring mechanism 28 associated with the portion of the elongated tube 26 which extends below the counter 11. The mounting system shown in FIG. 1 is one type of mounting system which may be used in the present invention and is described in more detail in U.S. Patent Application Publication US2009/0166381, which is hereby incorporated by reference. It is noted that other types of mounting systems may also be used. For example, the mounting system 25 may be a threaded elongated tube and the anchoring mechanism may be a nut threaded onto the threads of the elongated tube (not shown).

The under-counter portion 24 also has a connecting member 30, located at the distal end 26D of the elongated tube 26. The connecting member 30 is removably connected to the distal end 26D of the elongated tube 26 at a top end of the connecting member 30. The connecting member 30 supports a reservoir assembly 32 which contains the fluid which is to be dispensed from the dispenser apparatus 10. The reservoir assembly 32 is removably connected to the connecting member 30 to the lower end 31 of the connecting member, also referred to as the reservoir assembly connecting surface, such that the reservoir assembly 32 can be removed and replaced when the fluid has been expended from the reservoir assembly 32.

The dispensing apparatus 10 further has a motor housing 202 which is positioned between the distal end 26D of the elongated tube 26 and the connecting member. The motor housing 202 may also contain the control electronics which controls the automatic nature of the dispensing apparatus 10. Attached to the motor housing is a power supply housing 204, which holds the power supply or transformer used to power the automatic dispensing apparatus 10 of with the scope of the present invention.

Figure 2:
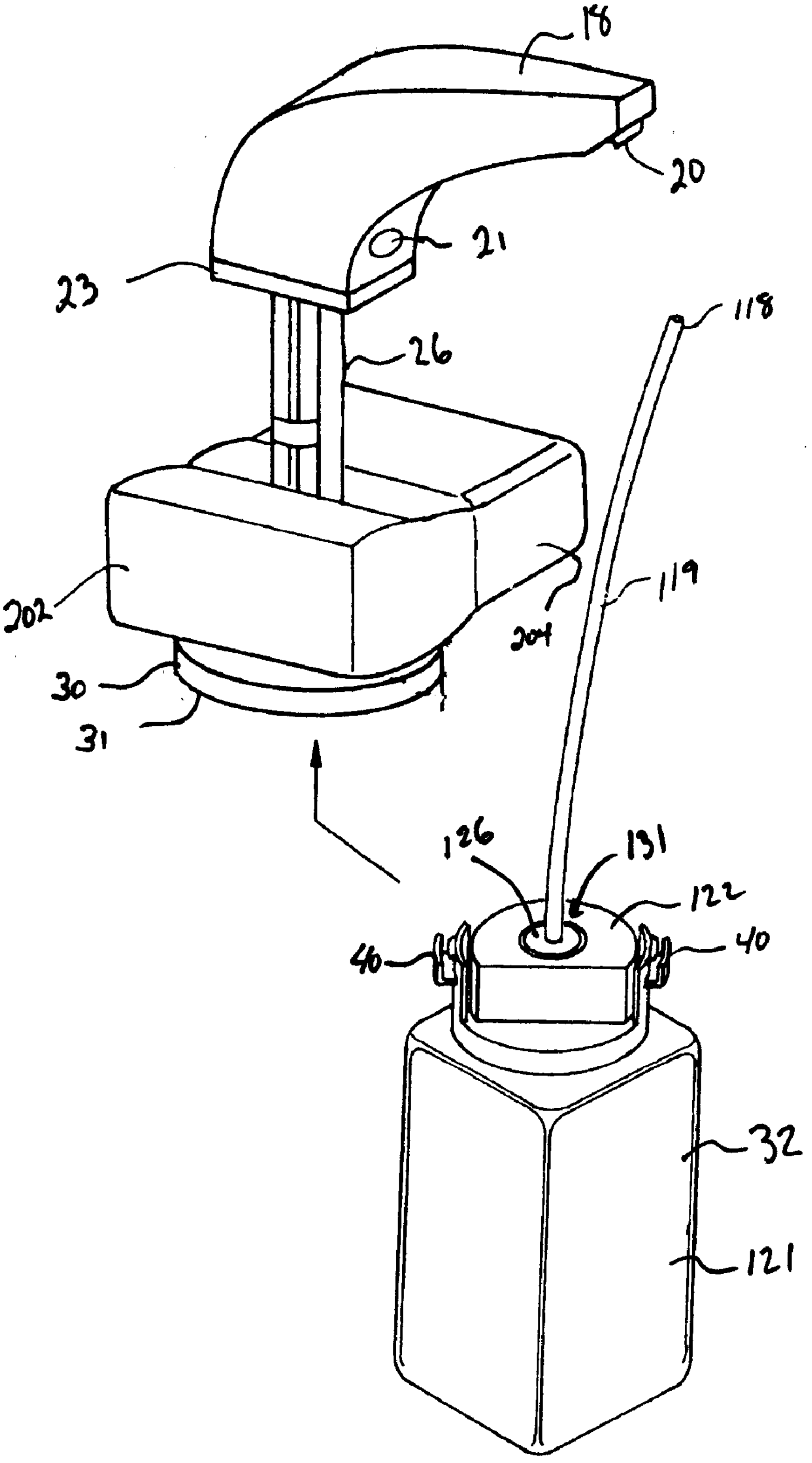
FIG. 2 shows a fluid dispenser with a top portion and a bottom portion separated.

Referring to FIG. 2, in one embodiment the reservoir assembly 32 includes a main container 121 and a top portion 122. The top portion 122 has connecting means 40 which fit into complementary connecting means located on the connecting member 30. That is, the connecting member 30 serves to hold the reservoir assembly 32 on to the dispensing apparatus 10 by having a complementary connecting means that allow the connecting mean 40 to effectively hold the main container to the dispensing assembly. A suitable connecting means is disclosed in U.S. Patent Application Publication US2009/0166381, which is incorporated herein by reference.

The reservoir assembly 32 has a dispensing tube 119 which extend out of the dispenser assembly. The dispensing tube 119 is generally an elongated tube which carries the fluid to be dispensed from the pump 114 (shown in FIG. 3) to the outlet 20 of the dispensing head 18. The fluid exits the dispensing tube through the dispensing end 118.

Figure 3:
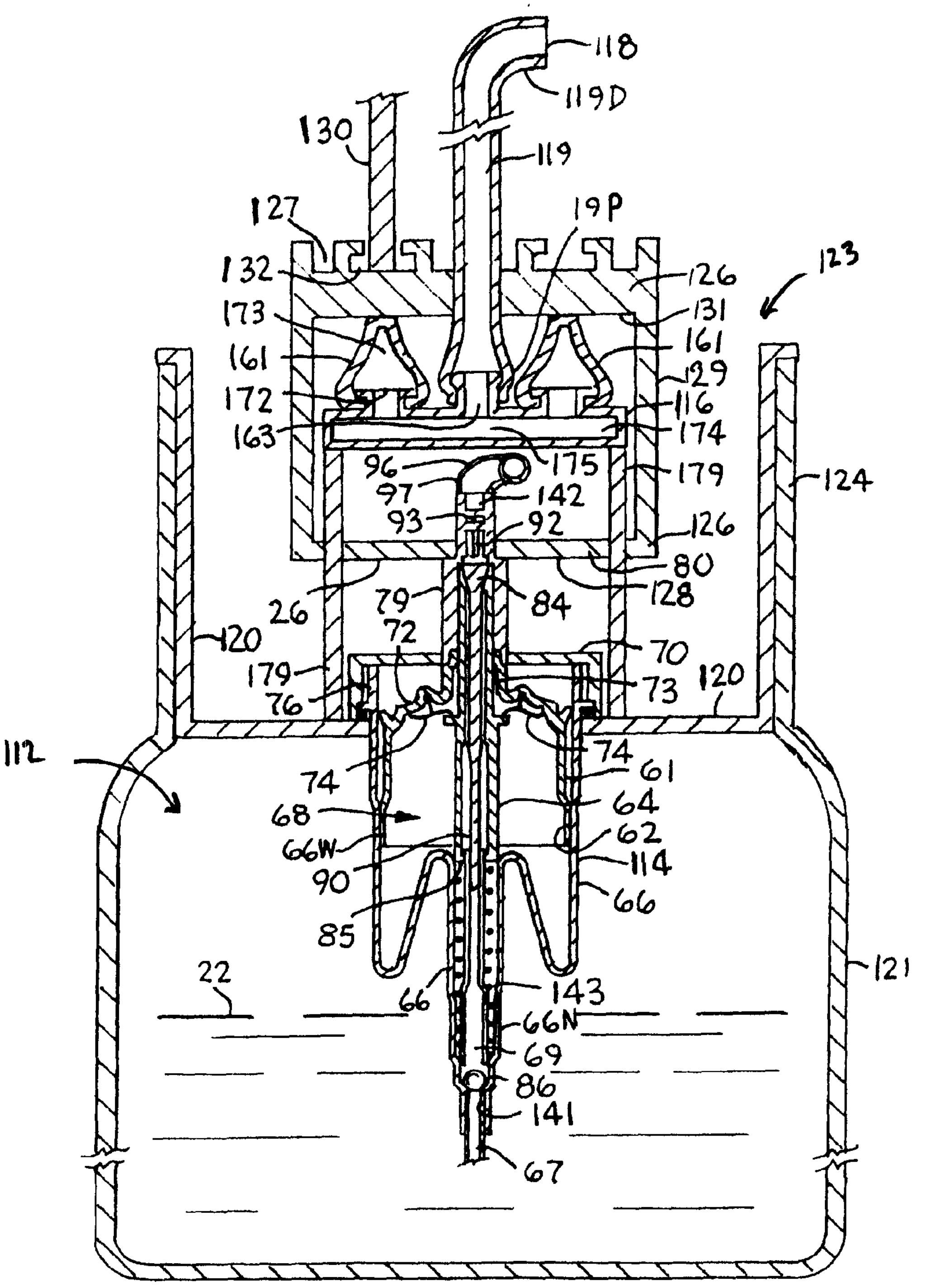
FIG. 3 shows a cut-away view of a pump mechanism useable in the fluid dispenser.

FIG. 2 shows the top portion 122 on the main container 121 and FIG. 3 shows the top portion removed from the main container 121, so that the internal works of the reservoir assembly 32 may be viewed. The main container 121 serves to hold and contain the fluid 22 which is to be dispensed from the dispenser 10. The main container 121 will have an opening 123 at the top, which is not shown in FIG. 2. The main container may also have a neck 124 near the opening, wherein the neck 124 of the main container forms the opening in the main container 121. Generally, the top portion 122 is attachable to the main container 121 at neck 124 of the main container 121. The top portion 122 may be secured to the main container 121 in a manner such that the top portion 122 is removably secured to the main container 121 or such that the top portion 122 is permanently secured to the main container 122. For example, the top portion 122 may be sealed to main container 121 using ultrasonic welding, adhesive or other suitable means of effecting a permanent attachment of the top portion 122 to the main container 121. If it is desirable that the top portion 122 is removable from the main container 121, the top portion 122 could be mated to the main container 121 using known methods, such as providing threads (not shown) on the top portion 122 and complementary threads 128 shown in FIG. 4 on the main container 121. Other similar methods could be used to removably secure the top portion 122 to the main container 121.

Located within the main container 121 is a pump 114, shown in FIG. 3. As shown in FIG. 3, the pump 114 is located in the opening 123 of the main container 121, generally in the neck 124 of the main container. It is also possible that the pump 114 may be located in the top 122 of the main container 121, or located at the bottom of the main container 121. For the purposes of describing the present invention, the pump will be described as being generally located in the neck 124 of the main container 121. Generally speaking, the pump 114 has an inlet 141, an outlet 142 and a recovery means 143. As with most pumps, the pump 114 has an idle stage, a discharging stage, and a charging stage. In the idle stage, which is shown in FIG. 3, the pump 114 mechanism is at rest and is not actively charging or discharging the fluid. The discharging stage of the pump is a stage in which a shot of the fluid is expelled from the pump 114 through the outlet 142 of the pump. In the charging stage of the pump 114, a shot of the precursor fluid 22 is drawn from the reservoir 112 through the inlet 141 into the pump 114. Typically, the fluid is drawn into the inlet of the pump 114 through a dip tube 67. The recovery means 143 allows the pump 114 to return to the idle stage from the end of the discharging stage. As the pump 114 is returning to the idle stage from the end of the discharging stage, the pump 114 is in the charging stage. Further details of a pump 114 useable in the present invention will be described below.

As shown in FIG. 3, the dispenser 10 may be provided with a pump mounting element 120. This pump mounting element 120 may be used to hold and/or secure the pump 114 and the suck back mechanism 116, when present, within the neck 124 of main container. The pump mounting element 120 fits into the opening 123 of the main container 121, which is shown in FIG. 3 and may be permanently mounted in the opening or removably mounted in the opening. Alternatively, the pump mounting element 120 may be associated with the top portion 122 of the dispenser. That is, the pump mounting element 120 may be removably connected to the top portion 122 of the reservoir assembly 32. In another alternative configuration, the pump mounting element 120 may be permanently connected with the top portion 122 of the dispenser such that the pump mounting element 120 forms a bottom surface of the top portion 122. Alternatively, the pump 114 could be housed within the main container 121.

As is shown in FIG. 3, the pump device 114 is located inside the neck 124 of main container 121, as described above, and serves to draw the fluid or fluid precursor 22 from the main container 121 of the reservoir 112 and force the fluid out the dispensing end 118 of the elongated tube 119 and out of the delivery spout 20 of the dispenser 10. The pump device 114 may be advantageously constructed from widely available “stock” components in order to enhance manufacturing efficiencies. In one embodiment of the present invention, pump device 114 is a foam pump of the type in widespread use with other foaming devices. Suitable pumps may be purchased from a variety of pump manufactures including, for example Rexam Airspray, Inc., having offices at 3768 Park Central Blvd, North, Pompano Beach, Fla., USA, and Rieke Corporation 500 W. $7^{th}$ Street, Auburn Ind., USA. A suitable commercially available pump is the F2 foaming pump available from Rexam Airspray, Inc. Many other models of foam pumps are also available on the market, and may be utilized depending on variables such as shot size and the like. It is also possible to use a commercially available pump device which may or may not be modified in several ways for use in dispenser apparatus 10, depending on the application or fluid to be dispensed from the dispenser apparatus 10.

To gain a better understanding of an exemplary pump that may be used in the present invention, attention is again directed to FIG. 3. As shown, pump device 114 is a foaming pump and includes an outer tubular piston 62 and an inner tubular piston 64 located inside of a pump cylinder 66. It is noted that non-foaming pumps may also be used in the dispenser of the present invention, when the fluid to be dispensed from the dispenser is a non-foaming fluid. As is shown, the pump cylinder 66 has a wide portion 66W and a narrow portion 66N. The outer tubular piston 62, the wide portion 66W of the pump cylinder 66 and the outer surface of the inner piston 64 form a first chamber 68, which is an air chamber. The inner piston 64 and the narrow portion 66N of the pump cylinder 66 form a second chamber 69, which is the fluid chamber. The pump device 114 further includes a cap element 70, which is maintained in an axially fixed relation with respect to pump cylinder 66. Cap element 70 is advantageously used to mount the pump device 114 within reservoir 112, and as shown, more particularly; to the pump mounting element 120, which is either contained within the main container 121 or the top portion 122 of reservoir assembly 32. In the illustrated embodiment, for example, pump mounting element 120 is configured as a disc-shaped member having a threaded portion 76. The outer threads of threaded portion 76 are engaged by the inner threads of cap element 70, as shown in FIG. 3. Other suitable means may be used to hold the pump assembly 114 in the reservoir 112.

An engaging element or attenuator 126 is in communication to the pump’s piston assembly 61. Typically, the attenuator 126 will be physically connected to the piston assembly 61. In the illustrated embodiment, attenuator 126 is configured has a cylindrical portion 79, and a disc-shaped flange 80. It is generally the cylindrical portion 79 which is connected to the piston 61 of the pump 114. Typically, the attenuator 126 is generally located near the central axis of the reservoir assembly 32, which provides advantages discussed below. Other features of the attenuator 126 are an upper structure 127 and a lower structure 128 which are connected by a connecting structure 129. The upper structure has a top surface 132. Reciprocative movement of attenuator 126 will cause piston assembly 61 to move within the pump cylinder 66. Piston assembly 61 is normally urged into an upward position (rest position), shown in FIG. 3, due to the force of a pump recovery means 143. The pump recovery means may be a compressible member or, in an electronic configuration, the motor may be used to recover the pump. Suitable pump recovery means 143 includes a helical spring, as is shown in FIG. 3.

As is stated above, the pump assembly 114 shown in FIG. 3 is a foaming pump. The foaming pump shown mixes the liquid 22 from the main container 121 with air within the pump structure. The outer piston 62 contains air inlet openings 72, which allow air to pass through the outer piston 62 to enter the air chamber 68. In addition, the outer piston 62 is provided with an air exhaust passage 73, which allows the air present in the air chamber 68 to escape the air chamber 68. To prevent air in the air chamber 68 from exiting the air inlet opening 72, a check valve 74 is positioned near the air inlet opening 72 which opens during the charging stage and closes during the discharging stage of the pump 114. This check valve 74 also prevents air and/or fluid from entering the air chamber 68 during the charging stage from the air exhaust passage 73 during the charging stage of the pump. Operation of this check valve is described in more detail in U.S. Pat. No. 5,443,569 to Uehira et al., which is hereby incorporated by reference.

Pump device 114 is further provided with additional check valves 84, 85 and 86 to ensure proper flow of the liquid through the pump. Check valve 86, located at the base of pump cylinder 66, allows the liquid 22 to be drawn into a lower liquid chamber 69, through the inlet 141 of the pump when the inner piston 64 moves in an upward direction (charging stage). When inner piston 64 moves in a downward direction (discharging stage), check valve 85 allows the liquid 22 to be passed into an upper liquid chamber 90 from the lower liquid chamber 69. In addition, check valve 84 allows fluid to exit the upper pump chamber 90 into the mixing chamber 92. Both check valves 84 and 85 are opened at the same time and close at the same time. In the mixing chamber 92, air from the air chamber 68 is mixed with the liquid 22 from the upper liquid chamber 90. The mixing of the air and liquid creates a foam fluid which is forced through a porous member 93. The porous member 93 is in the form of a porous net or screen-like structure to create uniformity in the foam bubbles of the fluid. The fluid is then force through the outlet 142 of the pump 114. While a variety of different check valve configurations are contemplated, the illustrated embodiment utilizes common ball and seat valves. Other configuration of these elements may be used without departing from the scope of the present invention. Other structures and functional elements, such as seals and gaskets may be used in the pump device to the pump form leaking or improve the function of the pump. As is stated above, the pump 114 is described as a foaming pump; however, a foaming pump is one specific embodiment of the present invention. Non-foaming pumps may also be used in the dispenser of the present invention as a second embodiment.

Figure 4:
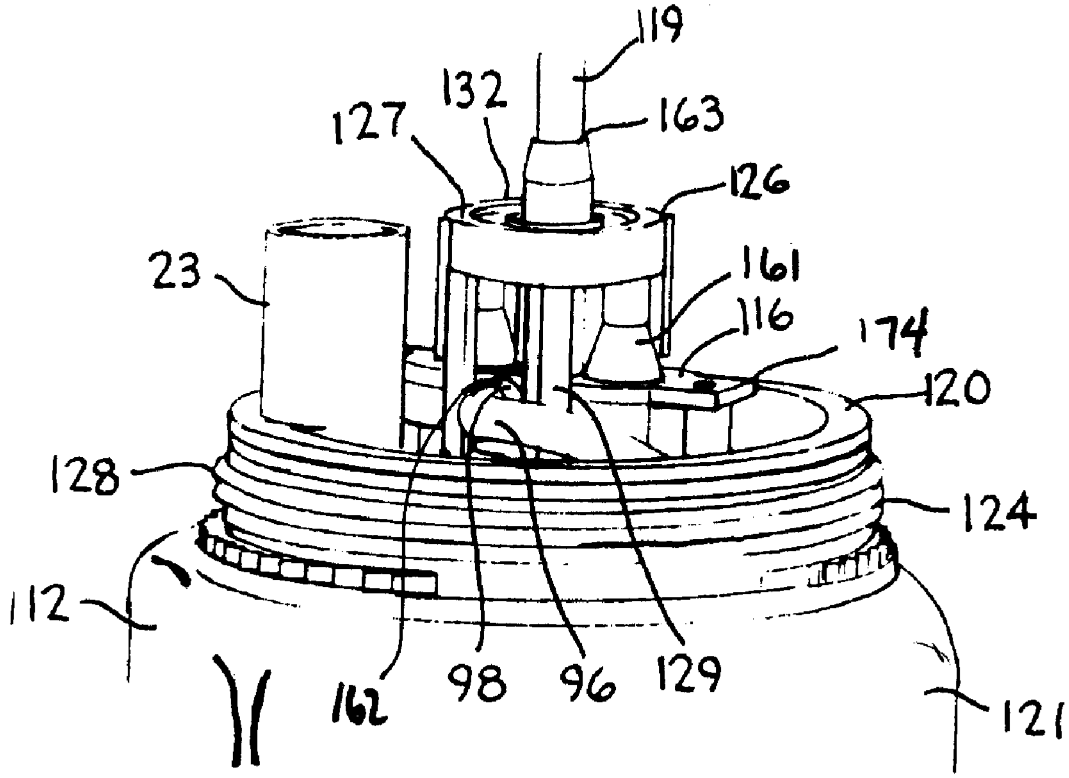
FIG. 4 shows a perspective view of the top portion of the dispenser with the cover removed.

The fluid leaving the outlet 142 of the pump 114 is transported to the elongated tube 119 via a flexible tube 96. Generally, the outlet 142 of the pump 114 typically moves with the piston assembly 61. To counter act this movement, the outlet 142 of the pump 114 a flexible tube 96 has a first end 97 attached to the pump outlet 142. The second end 98 of the flexible tube 96 is attached to an inlet 162 of a stationary member 174, is shown in FIG. 4. Referring back to FIG. 3, the stationary member 174 has a passage 175. The stationary member 174 also has an outlet 163, which is connected the elongated tube 119. The stationary member is supported or held in place by a mount 179. By having the stationary member 174 and the flexible tube 96, the movement of the pump piston assembly is not transferred to the dispensing tube 119.

A suck back mechanism 116 may be optionally included within the dispenser. Suck back mechanisms are described in U.S. patent application Ser. No. 12/329,904, filed on Dec. 8, 2008, which is incorporated by reference, and provides a means to prevent the dispenser from dripping into the sink between uses. Generally, the suck back mechanism 116 is separate and distinct element from the pump 114. Also the suck back mechanism 116 has at least one resilient member 161 capable of storing fluid which may be connected to the stationary member 174. The resilient member 161 is generally hollow structures having an opening 172 located near the portion of resilient member 161 which is to be positioned at or near the stationary member 174. The hollow portion 173 of the hollow structure allows the resilient member 161 to store the fluid. Generally, the suck back mechanism 116 operates by forcing the hollow structure of the resilient member 161 is to collapse, thereby forcing the fluid within the hollow portion 173 out of the hollow portion. Then the resilient member 161 is allowed to its original shape and size, which creates a vacuum, which causes the fluid to be refilled in the resilient member. Generally, at the end of the discharging stage of the pump 114, undispensed fluid remains between the dispensing end 118 and the second opening 163 of the stationary member 174. A portion of the undispensed fluid is drawn into resilient member 161, which prevents the undispensed portion from dripping out of the dispensing end 118 of the dispensing tube 119 and helps prevent stringing of the fluid dispensed to the user with the undispensed fluid. The suck back mechanism 116 may operate independently from the pump 114 or may operate in conjunction with the pump 114. When operated separately from the pump, the suck back mechanism does not rely upon the recovery means 143 of the pump. When operated in conjunction with the pump, the pump's recovery means 143 assists recovery of the resilient members during the charging stage of the pump. The first opening 162 of the stationary member 174 is connected to the outlet 142 of the pump 114.

Optionally, one further element that may be present is a filling port 23, as is shown in FIG. 4, which allows the reservoir 112 to be filed with the fluid.

To activate the actuator 126 to dispense the fluid from the dispenser apparatus 10, an actuator rod 130 contacts the top surface 132 of the actuator 126, as is shown in FIG. 3. Alternatively, the actuator rod may be connected to the top surface 132 of the actuator 126. The actuator rod 130 may contact the top surface 132 of the actuator 126 by passing though an actuator opening 131, shown in FIG. 2, located in the top portion 122 of the reservoir assembly 32. The actuator opening 131 is generally positioned about the center line of the top portion 122, as is shown in FIG. 2, as is the upper surface 132 of the attenuator. In one embodiment of the present invention, the tube 119, connecting the dispensing end 118 to the second opening 163 will be centrally located in the actuator opening 131, as is shown in FIG. 2. The actuator opening 131 may be a single opening such that the actuator rod 130 can come into contact with top surface 132 of the actuator 126.

As the actuator rod 130 depresses the actuator 126, the actuator 126 depresses the piston assembly 61, including both the outer tubular piston 62 and the inner tubular piston 64 of the pump, transitioning the pump 114 from the rest stage to the discharging stage. Depressing the resilient members 161, when present, also causes any fluid within the hollow portion 173 to be expelled from the resilient members 161 into the passage 175 and towards the dispensing end 118 of the dispenser. In addition, fluid is expelled from the pump 114 through the outlet 142 of the pump 114 into the flexible tube 96, which carries the passage 175. The fluid enters the passage 175 and joins the fluid expelled from the resilient member 161, when present. The fluid is also expelled from the delivery spout 20 of the dispenser 10. At the end of the actuator's 26 depressing the resilient member 161, when present, and the piston assembly 61 of the pump 114, the pump recovery means 143 causes the pump to transition from the discharging stage to the charging stage. During the charging stage of the pump 114, the actuator 126 is returned to its rest position, shown in FIG. 3, which in turn allows the resilient member 161, when present, to return to its original shape from a compressed state. As the resilient member 161 is returned to its original shape, a vacuum is created; causing a portion of any undispensed fluid between the suck back mechanism 116 and the delivery spout 20 to be drawn back into the resilient member 161. It is this vacuum created and the drawing of the portion of the undispensed fluid into the resilient member 161, prevents the problems of stringing and dripping from the delivery spout 20 of the dispenser. As is stated above, the suck back mechanism is optionally present. If the suck back mechanism is not present, then the fluid is dispensed from the outlet 142 to the flexible tube, to the stationary member 174 and to the delivery tube 119.

In the present invention, the dispenser assembly 10 is a hands-free dispenser. As such, dispenser assembly 10 is electronically actuated by an electronic means such as a motor. In one embodiment, the sensor 21 is selected such that the sensor 21 is able to detect a user's hands under the spout 20. The sensor 21 may be an IR sensor or other similar type of sensors could sense a user's hands under the spout 20. When the sensor 21 detects a user's hands under the spout 20, the sensor 21 sends a signal to the control circuitry that a user has requested a dose of the fluid by placing their hands under the spout. The control circuitry in turn sends a signal to a motor 210, shown in FIG. 5, to activate the motor for a set cycle.

Figure 6:
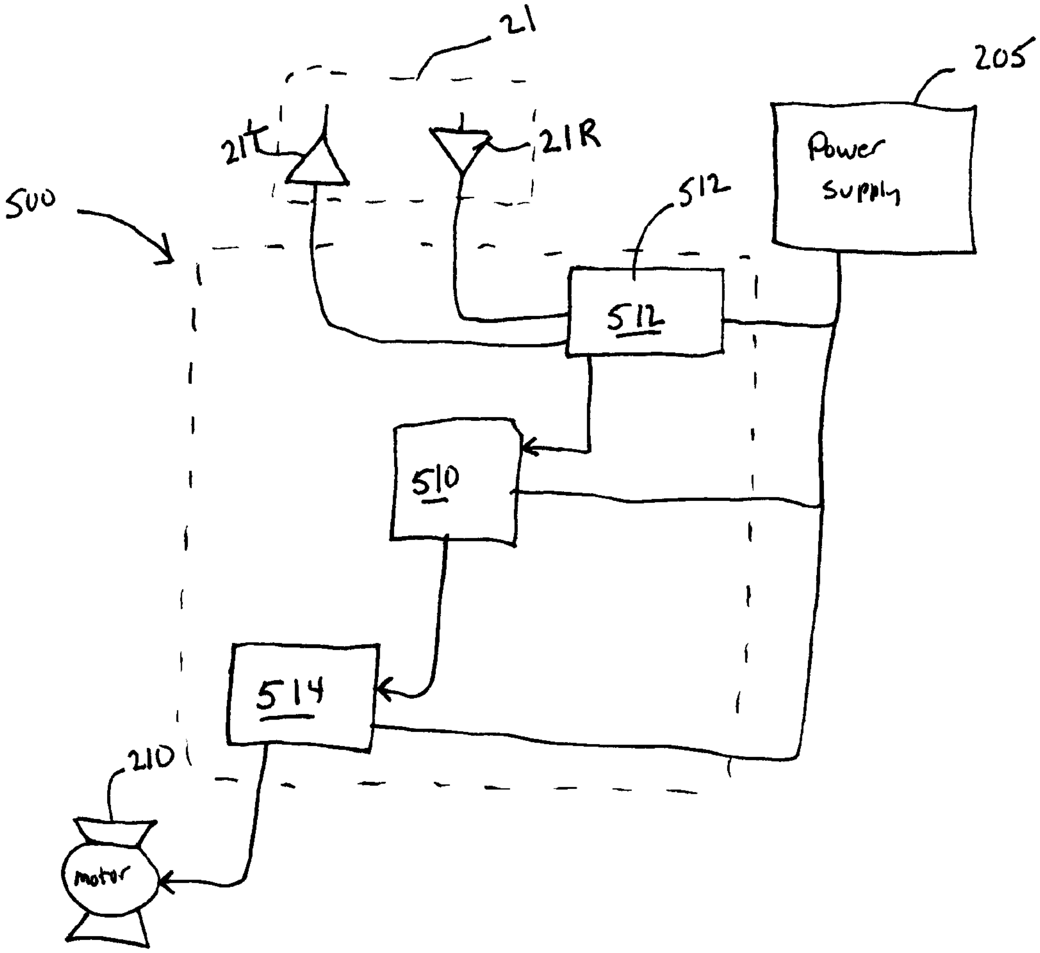
FIG. 6 shows an exemplary wiring diagram useable in a dispenser of the present invention.

In a particular embodiment, the sensor 21 is electrically connected to a control panel (not shown) having control circuitry 500, shown in FIG. 6 and is discussed in more detail below. The control panel, with its control circuitry, may be located in the motor housing 202 or the power supply housing 204. Optionally, the control panel may be located in a separate compartment or housing. The actual location of the control panel and control circuitry is not critical to the present invention.

Typically, the power supply housing 204 may be separated from the motor housing so that the power supply may be replaced when needed. That is, the power supply is disconnectable and reconnectable to the motor housing 202. To ensure that power is transferable from the power supply 205 in the power supply housing 204 to the motor housing 202, electrical contact points may be used on both the motor housing 202 and power supply housing 204. These electrical contact points are in complementary positions, meaning that when the power supply 205 in the power supply housing 204 is attached to the motor housing 202, an electrical connection is made. The power supply 205 powers the entire unit, including the sensor 21, control circuitry 500, including the processor and the motor 210.

The power supply 205 for the fluid dispensing system of the present invention may include disposable DC batteries (not shown). Alternatively, the power supply 205 may be a closed system which requires that the entire power supply be replaced as a single unit. Although not shown in the figures, an AC to DC adapter/transformer may be utilized to provide an alternate source of power to the fluid dispenser. This embodiment may be particularly useful wherein the fluid dispenser is mounted in close proximity to an AC outlet or when it is desirable to power multiple dispensers from a centrally located transformer of suitable configuration and power. The number of batteries used to power the motor will depend on the motor selected for the dispenser. Disposable batteries useable in the present invention include 9 volt batteries, 1.5 volt batteries, such as D-cell or C-cell batteries, or other similar batteries. The exact type of battery selected for use is not critical to the present invention so long as the power supplied to the motor is compatible for the motor. For applications where the fluid dispenser will be used under low usage situations, rechargeable batteries could be used. If the dispenser is to be used in a bright light situation, the batteries could be solar rechargeable batteries.

Once the processor receives the input from the sensor, the processor sends power to the motor 210, which in turn actuates the pump. To gain a better understanding of a possible configuration of the motor housing 202, attention is now directed to FIGS. 5A, 5B, 5C and 5D. The motor housing 202 houses a motor 210, gears 211, 212, which are engaged with motor 210 and an additional gear 213 which drives an actuator rod 130. The motor driven actuator rod 130 is housed in the motor housing 202 and extends from the motor housing 202 through an opening present in the lower surface of the connecting member 30 which is shown in FIG. 1. Any method may be used to drive the motor driven actuator rod 130. In a typical operation of the electronic fluid dispensing system, the motor driven actuator rod 130 contacts the actuator 126 and pushes the actuator 126 downward to activate the pump 114, one or more times, to expel a dose of the fluid from the delivery spout 20 of the dispensing head 18.

Figure 5A:
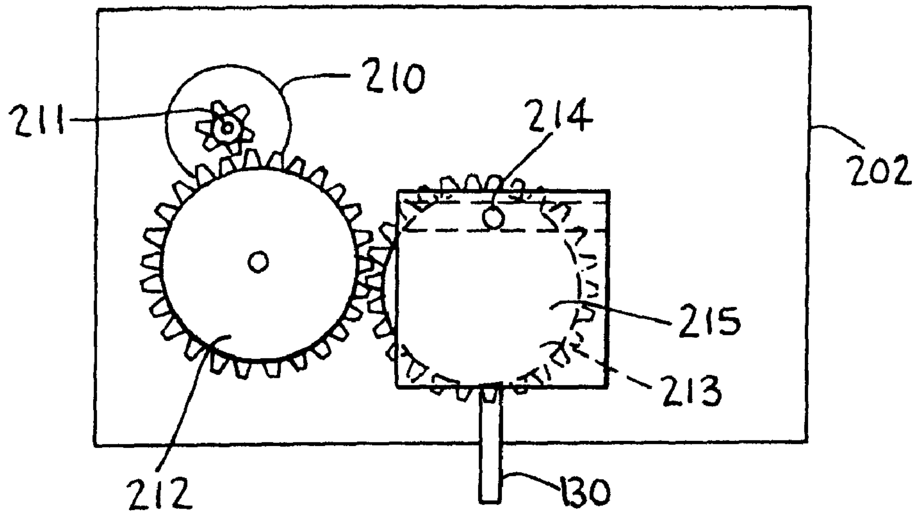
FIG. 5A shows a front view of a motor power transmission system usable in the present invention.

Numerous ways may be used to transfer power from an activated motor 210 to the motor driven actuator rod 130. For example, the motor 210 may drive a series of wheels, gears or other energy transmission means to the actuator rod 130 which extends and contacts the actuator 126. In one embodiment of the present invention, which is intended to be an exemplary means that may be used to drive the actuator rod 130, the drive wheel 213 has a post or shaft 214 extending from one area of the gear body near the periphery 215, as is shown if FIGS. 5A and 5B. As the motor 210 turns the motor drive wheel 211, the motor drive wheel 211 in turn rotates one of more wheels 212. In FIG. 5A, a single wheel 212 is shown; however, it may be desirable to have more wheels to reduce the rotational speed of the actuator drive wheel 213, so the pump 141 is activated in a controlled manner. It is within the skill of those skilled in the art to select the ratio of drive wheel so that the appropriate speed is achieved of the actuator drive wheel 213. It is noted the term “wheel”, as used herein, is intended to cover any wheel like mechanism, including wheels per se and other wheel-like mechanisms, such as gears. Generally, gears are desirable, since gears are less likely to slip during use.

Figure 5B:
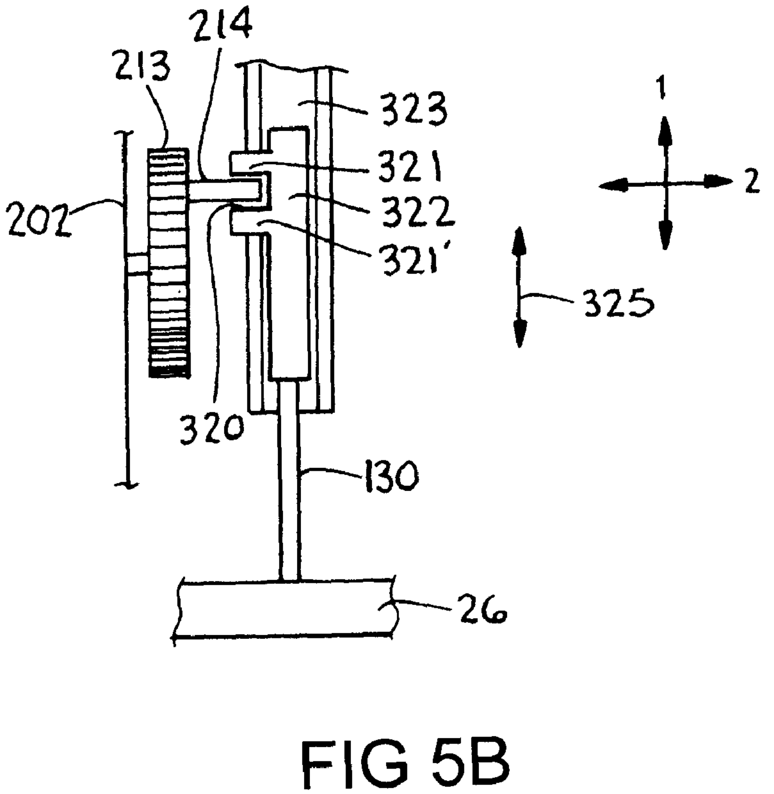
FIG. 5B shows a side view of an actuator drive wheel and an actuator guide member of an embodiment of the present invention.
Figure 5C:
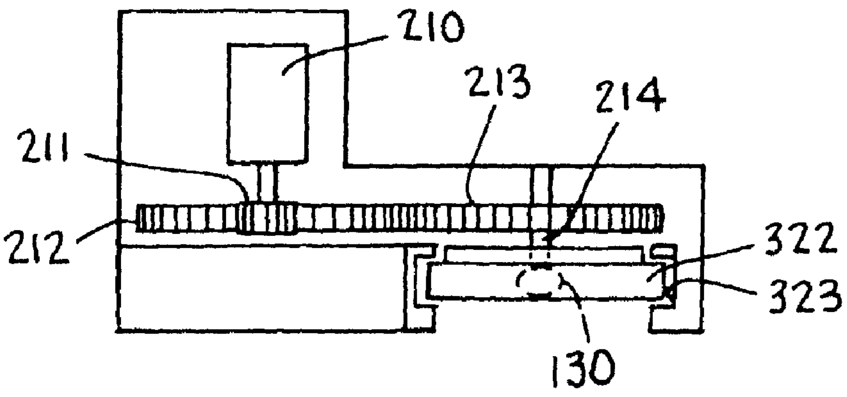
FIG. 5C shows a back side view of an actuator guide member of an embodiment of the present invention.
Figure 5D:
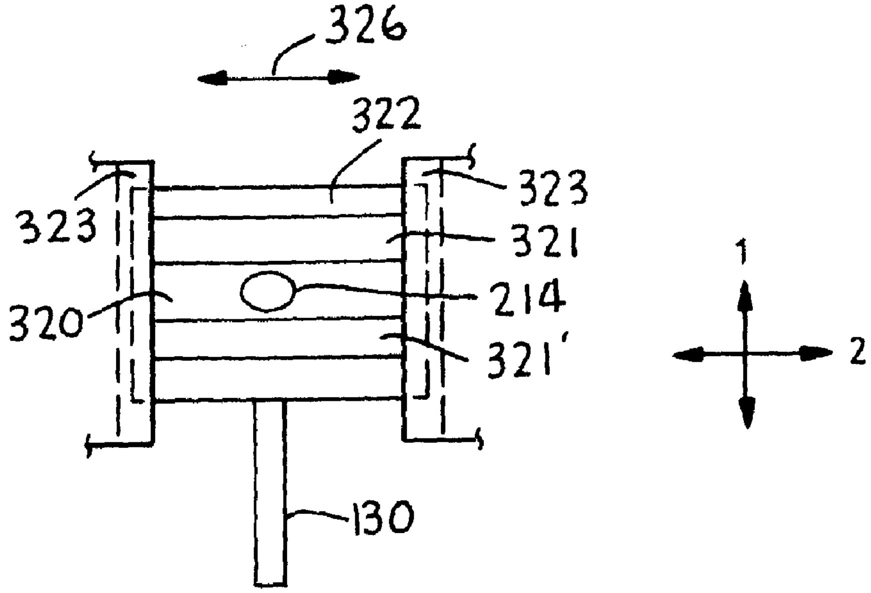
FIG. 5D shows a top view of a motor power transmission system embodiment usable in the present invention.

As is shown in FIG. 5B, the actuator drive wheel 213 has a shaft 214 extending from a non-central area of the actuator drive wheel 213, which makes the shaft rise and lower in the direction 325 as the actuator drive wheel 213 turns. This shaft 214 is fitted into a horizontal channel 322 present in the actuator guide member 320. The horizontal channel 322 is generally in the horizontal axis 2. The horizontal channel 322 is created by two horizontal protrusions 321 and 321' extending from one of the sides of the actuator guide member 320. As the actuator drive wheel turns, the shaft 214 travels in a circular path and has a vertical movement 325 in the vertical axis 1, shown in FIG. 5B and a horizontal movement 326 in the horizontal axis 2, shown in FIG. 5C. The vertical movement 325 of the shaft 214 causes the actuator guide member 320 to move up and down in the vertical axis 1, which in turn moves causes the motor driven actuator rod 130 to also move in an up and down manner in the vertical axis. Below the channel 322 present on the actuator guide member 320 is the actuator rod 130. The actuator guide member 320 is held in place so that the movement of the actuator guide member is in an up and down manner in the vertical axis and not side to side or front to back. The actuator guide member 320 may be held in place, for example by providing vertical guide slots 323 so that the lateral sides of the actuator guide member 320 are held in place on the horizontal axis. These vertical guide slots 323 may be provided in the motor housing 202 as is shown in FIG. 5B, 5C and 5D.

As is mentioned above, the shaft 214 also has a horizontal movement 326 in the horizontal axis 2. This horizontal movement is essentially unwanted. To account for the horizontal movement, the shaft is allowed to move horizontally in the horizontal axis 2 along the channel 322 in the actuator guide member. Therefore, the channel 322 controls the essentially unwanted horizontal movement 326 of the shaft 214.

The hands-free fluid dispensing systems may also have additional features. For example, dispensing head 18 may have indicator lights to signal various events, such as, recognition of a user, low battery, empty soap reservoir, or other conditions such as a motor failure. Examples of such lights include low power consumption lights, such as LED (light emitting diodes).

In the present invention, the control circuitry 500 contains a processor 510 which has an on-board clock. The processor 510 is in communication with both the sensor 21 and the motor 210. A general diagram of a control circuit 500 which may be used in the present invention is shown in FIG. 6. Generally described, the control circuit has a processor 510, a sensor circuit 512 and a motor drive circuit 514. Each of the sensor circuit 512, the processor 510 and motor drive circuit 514 are powered by the power supply 205. In operation of this circuit, the sensor circuit 512 sends a signal to the transmitter 21T of the sensor 21 to transmit a signal from the transmitter 21T. The receiver 21R of sensor 21 receives a signal back from the transmitter 21T. When a users hand is detected by the receiver 21R, the sensor circuit 512 sends a signal to the processor 510 which is recognized by the processor as a signal to activate the motor 210, since a user’s hands were detected. The processor 510, in turn, sends a signal to the motor drive circuit 514. The motor drive circuit 514 activates the motor 210, which in turn activates the attenuator rod 130, the attenuator 126 and pump, causing the dispenser of the present invention to dispense the fluid. This description is only for the basic components present in the control circuitry. Addition other components, such as warning lights for condition like low battery, empty soap reservoir, or other conditions such as a motor failure could be included in the control circuitry by those skilled in the art. Exemplary control circuitry for sensors, lights and buttons is known to those skilled in the art and is shown, for example in U.S. Pat. No. 6,929,150 to Muderlak et al., which is hereby incorporated by reference The processor 510 is configured to determine a time interval between dispensing cycles. The processor 510 has an on-board clock function which determines the time between requests for the fluid. The processor 510 determines the lapsed time between the current request for soap from the user and the previous request for soap. If the time difference is greater than a preset time, the processor 510 will send a signal to the motor drive circuit indicating that a larger amount of soap needs to be dispensed. In the present invention, the processor 510 and motor drive circuit 514 can activate the motor for a single cycle or for multiple cycles. As used herein, a cycle is one attenuation of the pump to dispense a single shot of the fluid.

The processor 510 has a clock function which is able to keep time between a current request for the fluid and a previous request for the fluid. When the time period is greater than a preset time period, the processor 510 will instruct the motor 210 to activate for two or more cycles. This instruction will run through the motor drive circuit 514 as shown in FIG. 6, or may be run directly from the processor. Suitable processors include processors such as the 89LPC922 available from Phillips. Other similar processors may be used in the present invention without departing from the scope of the present invention.

In the present invention, the fluid dispensed from the dispenser may be a variety of fluids. Generally, the fluid dispensed will be a hand cleaning fluid, such as liquid soap, a liquid sanitizer, a gel soap, a foam soap precursor, a foaming sanitizer precursor or other similar hand cleaning or sanitizing liquid formulations. It is noted in the case of foaming soap precursor, or a foaming sanitizer precursor, these formulations are liquids before a foaming pump will convert these fluid to a foam.

Selection of the fluid that will be dispensed from the dispenser will affect conditions which will be used to dispense the fluid, including the pump and the pre-set time period. If the fluid to be dispensed is a foam precursor, the pre-set time period will be based on factors, such as the time period in which liquefaction of the foam soap occurs, temperature, pressure and other similar factors. Generally, preset time period will be set to a period of time which is liquefaction of the particular foam soap occurs being dispensed from the dispenser, or a period shorter than the liquefaction of the foam soap occurs. Generally, liquefaction of foam soaps occurs within about 1 hour. Therefore, the preset time period should be a time period of about 1 hour or less. In one embodiment of the present invention, the preset time is set for a period of time which is approximately one-half of the time in which liquefaction of the foam will occur. For example, if liquefaction occurs in 1 hour, the preset time would be set for 30 minutes. For most foam soaps and sanitizers, liquefaction occurs generally within 1 hour. Therefore, the preset time for most foam soaps will be set at 1 hour or less, for example, 50 minutes, 45 minutes, 40 minutes, 30 minutes, 20 minutes, 15 minutes, 10 minutes and the like. Generally, the pre-set time period will be between about 10 minutes and about 1 hour.

In the case of liquids (which are not foaming) being dispensed from the fluid dispenser, the pre-set period of period will generally be longer and will depend on conditions such as evaporation rate of the fluid, temperature, pressure and the components of the liquid. For liquids, the pre-set time period could be in the range of about 10 minutes and about 6 hours, or even longer.

Other features can include product recognition, where the reservoir assembly 32 has a product identification feature which can communicate with the control circuitry to identify the product being dispensed, or other features such as the size of the fluid pump in the reservoir assembly, the type of pump (fluid or liquid). The control circuitry would have a means to receive the product identification information. Exemplary product identification means includes RFID, optical sensor such as a bar code reader and other similar means. The processor could then adjust the preset time according to the product being dispense to account for the specific liquefaction time for the product being dispensed. In addition, other conditions, such as temperature and pressure could also be communicated to the processor, so that the preset time could be adjusted according to the environmental conditions.

In the present invention, if the lapsed time between dispensing events is larger than the pre-set time period, the motor 210 is operated such that multiple doses of the soap is dispensed. By multiple doses, it is intended to mean 2 or more doses in succession. Generally, only 1 or 2 additional attenuations of the pump are necessary in the present invention, but there could be more in the event of liquefaction. When multiple doses of the fluid are to be dispensed, the dispensing time between doses should be as short as possible. If the period is too long, the user will withdraw their hand or hands before the second or subsequent dose is dispensed. Typically, the multiple doses should occur in under 5 seconds, more desirably, under 2 seconds. Generally, the shorter the time period between doses, the better. In one embodiment of the present invention, the multiple doses are dispensed within about 0.5 seconds, typically between about 0.1 and 0.5 seconds.

Also, the control circuitry may include mode for start-up or replacement of the reservoir assembly. In such a mode, the processor would instruct the motor control circuit 514 to attenuate the pump through several cycles. Further, the control circuitry may have a delay circuit built in such that in a situation where the time between dispensing intervals is less than the pre-set time period, the motor will only attenuate the pump once for a set short period of time, such as 0.5 to about 2 seconds. This will prevent users from using too much fluid during a hand washing event.

Another feature which may be present in the fluid dispenser of the present invention is additional switches which may set the fluid dispenser to only dispense a single shot, or always dispense a double shot. A third setting on this switch would be for the dispenser to operate as described herein, dispensing a double shot of foam, if the time between dispensing is longer than a pre-set time period. Other switches or adjustments that could be used in a variable resistance switch which could be used to adjust and change the pre-set time period. Yet another switch could be used to set the type of fluid to be dispensed from the fluid dispenser.

The fluid dispenser of the present invention will generally delivery as much fluid soap necessary for a hand cleaning event. Generally, the amount of fluid will be up to about 3 ml or more of the fluid, depending on the nature of the hand cleaning or sanitizing fluid. For industrial applications, the upper limit for the amount of fluid being dispensed could be higher than 3 ml. For most hand washing events, the amount of the fluid will be less than 2 ml, and generally less than 1 ml. In a particular embodiment, the amount of the precursor delivered by the fluid dispenser is between about 0.45 ml and about 0.8 ml and more particularly, between 0.45 ml and 0.55 ml.

The present invention is also directed to a method of dispensing a fluid to a user from a fluid dispenser. This method has the steps of a. providing a dispenser assembly having sensor, a motor and a pump;
b. detecting the presence of a current user requesting fluid from the dispenser assembly;
c. determining a lapsed time between a previous request for fluid and the current request for fluid;
d. comparing the lapsed time to a pre-set time period;
e. activating a motor for a single cycle if the lapsed time is less than the set time period or for multiple cycles if the lapsed time is greater than the pre-set time period.

Figure 7:
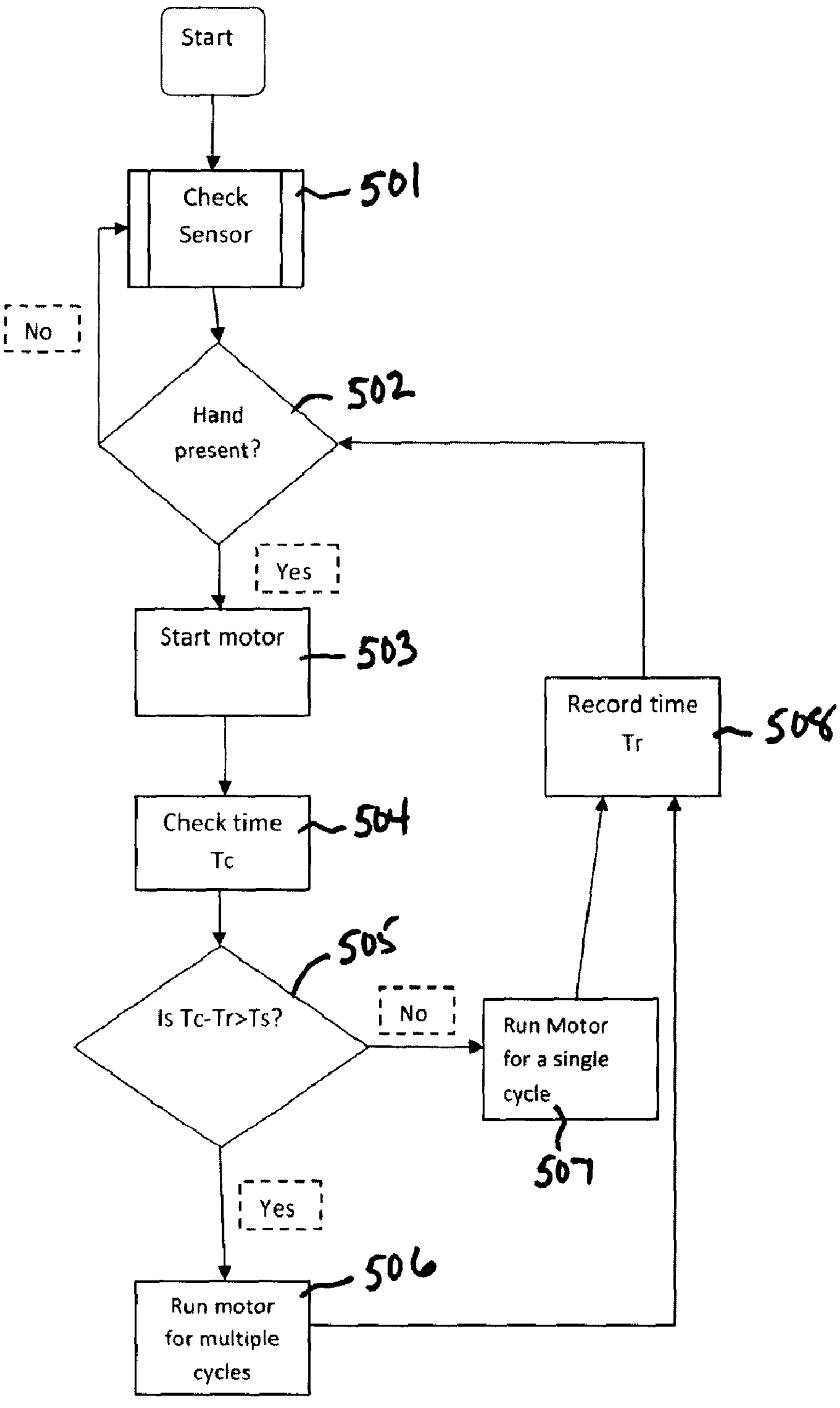
FIG. 7 shows a flow diagram useable in a dispenser of the present invention for determining when multiple cycles are used.

The method of the present invention is shown graphically in FIG. 7, which includes a processor having a clock. The process 500 has a dispenser assembly, wherein the dispenser assembly has a sensor. The sensor is checked at a regular basis (box 501). Next, if a hand is present or the sensor otherwise detects a user with their hand or hands under the nozzle (box 502), the motor is started (box 503) while the current time Tc is checked (box 504). If the lapsed time, which is the current time Tc minus the previously recorded time Tr is calculated greater than a set time Ts (box 505), then the motor is run for multiple cycles (box 506). If current time Tc minus the previously recorded time Tr is calculated less than a set time Ts (box 506) then the motor is run for a single cycle (box 507). At the end of the cycle, whether a multiple cycle or a single cycle, the processor records the time Tr (box 508). At this point the dispenser again returns to detecting a hand near the sensor (box 502).

As an alternative embodiment, rather than calculating the lapse time, the processor could be set up with a timer. In such a configuration, the lapsed time is determined from the timer. At box 505, the timer is rest to zero and the time on the timer at box 505 is the lapsed time, which is compared to the set time Ts.

Obtaining multiple cycle operation of the motor, can be accomplished in different methods. One method, the processor will provide a higher voltage to the motor, which will make the motor run faster to dispense the fluid. Another method is to have a motor which runs as quick as necessary to achieve the desired dispensing time.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A method of dispensing a fluid to a user from a dispenser, said method comprising a. providing a dispenser assembly having a sensor, a motor and a pump;

b. detecting the presence of a current user requesting the fluid from the dispenser assembly;

c. determining a lapsed time between a previous request for fluid and the current request for the fluid;

d. comparing the lapsed time to a pre-set time period;

e. activating the motor for a single cycle if the lapsed time is less than the pre-set time period and activating the motor for two or three cycles if the time lapse is greater than the set time period.

2. The method according to claim 1, wherein the fluid comprises a liquid soap, a liquid sanitizer, a gel soap, a foam soap precursor or a foaming sanitizer precursor.

3. The method according to claim 1, wherein the pre-set time period is between about 10 minutes and about 6 hours.

4. The method according to claim 2, wherein the fluid is a foam soap precursor.

5. The method according to claim 4, wherein the pre-set time between about 10 minutes and about 1 hour.

6. The method according to claim 1, wherein the volume of fluid is between about 0.45 ml and about 2.0 ml.

7. The method according to claim 6, wherein the volume of the fluid is between about 0.55 ml and 0.65 ml.

* * * * *